United States Patent Office 3,108,114
Patented Oct. 22, 1963

3,108,114
SELECTED 2-OXAZOLINES AND 2-THIAZOLINES
AND THEIR PREPARATION
Carl G. Krespan, Wilmington, Del., assignor to E. I. du Pont de Nemours and Company, Wilmington, Del., a corporation of Delaware
No Drawing. Filed Oct. 2, 1961, Ser. No. 141,958
13 Claims. (Cl. 260—306.7)

This invention relates to, and has as its principal objects provision of, certain fluorinated heterocyclic organic nitrogen compounds and a method of preparing the same.

2-oxazolines and 2-thiazolines, i.e., compounds containing the five-membered heterocyclic structures

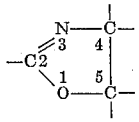

and

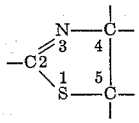

are theoretically possible in many variations of substituents on the ring carbons. Examples with halogen substituents have not been reported heretofore, however, and the species containing fluorine at the 4- and 5-positions, especially, are unlikely to be obtained by the usual methods of preparation because of unavailability or unsuitable chemical activity of the necessary intermediates.

It has now been discovered that new fluorinated 2-oxazolines or 2-thiazolines, respectively, can be obtained readily by reaction of organic nitriles with fluoroolefin epoxides or episulfides. These 2-oxazolines and 2-thiazolines are generically 4,5-difluoro-2-oxazolines and -2-thiazolines having the structural formula

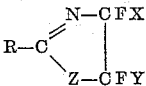

where R is hydrocarbon, X and Y are halogen or halohydrocarbon, and Z is oxygen or sulfur (i.e., a chalcogen of atomic number 8 to 16). In this formula, R is a monovalent hydrocarbon group of up to 18 carbons and may be alkyl (e.g., methyl, ethyl, neopentyl, dodecyl, octadecyl), cycloalkyl (e.g., cyclopropyl, cyclohexyl, cyclodecyl), aryl (e.g., phenyl, biphenyl, anthracenyl, naphthyl, coronenyl), aralkyl (e.g., benzyl, 2-phenylethyl, (1-naphthyl)-methyl), alkaryl (e.g., p-tolyl, p-cumyl, p-dodecylphenyl), alkenyl (e.g., vinyl, allyl, 2-butenyl, 9-decenyl, 8-heptadecenyl), aralkenyl (e.g., β-phenylvinyl, cinnamyl), alkenyl (e.g., ethynyl, propargyl, 8-decynyl, 8-hepta-decynyl); and X and Y, which may be alike or different, can be halogen of atomic number 9–17 (i.e., fluorine and chlorine) or monovalent haloalkyl, including perhaloalkyl, of up to 18 carbons, all halogen being of atomic number 9–17; or taken together X and Y may be haloalkylene of up to 8 carbons, all halogen again being of atomic number 9–17. In especially preferred embodiments, X and Y are fluorine or monovalent perfluoroalkyl, ω-chloroperfluoroalkyl or ω-hydroperfluoroalkyl groups.

The compounds of this invention are prepared by a process illustrated by the equation:

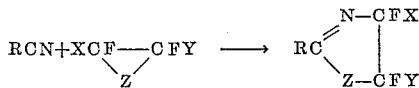

in which R, X, Y and Z have the preceding designations. This reaction, that of a hydrocarbon nitrile and a fluoroolefin epoxide or episulfide, is carried out at temperatures in the range of −50 to +250° C., preferably in the range of about 0 to 175° C. For reasons of economy, stoichiometric quantities of reactants are generally used but proportions can be varied widely without change in the result. The ratio of nitrile to epi-compound is, however, usually held between 1/5 and 5/1 but can be higher, e.g., 100/1 (cf. Example IV below where the ratio is around 42/1). A solvent is not essential but can be used if desired. The solvent is generally inert, e.g., hydrocarbon such as hexane, cyclohexane, benzene, toluene or the like, or halohydrocarbon such as chloroform, carbon tetrachloride, chlorobenzene or the like, but may be an excess of the nitrile reactant. Ordinarily the reaction is accomplished in a closed vessel at the autogenous pressure of the reactants, which pressure can be below or above atmospheric pressure. The actual pressure is not critical, however, and the reaction can, if desired, be carried out in a suitable vessel open to the atmosphere. The reaction vessel can be of metal or glass, constructed to suit the conditions of operation. The time of reaction is not critical and can vary from less than a minute to many hours to suit the particular conditions and mode of operation chosen.

The preparation of 2-oxazolines from hydrocarbon nitriles can be accomplished by either of two optional procedures, each involving the essential fluoroolefin epoxide intermediate, i.e., the epoxide can be generated in situ from oxygen and the appropriate fluoroolefin or it can be preformed. When the epoxide reactant is generated in situ a molar ratio of oxygen: fluoroolefin between 1:1 and 1/2:1 is generally employed at the autogenous pressure of the reaction chamber.

The process and products are illustrated in more detail in the following nonlimiting examples.

EXAMPLE I

2-Phenyl-4,4,5,5-Tetrafluoro-2-Oxazoline

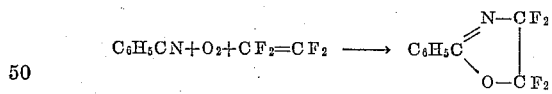

A mixture of 15.5 g. (0.15 g. mole) of benzonitrile and 15.0 g. (0.15 g. mole) of tetrafluoroethylene under autogenous pressure in an 80-ml. pressure vessel was heated at 175° C. while 4.8 g. (0.15 g. mole) of oxygen was injected in portions over a period of 45 minutes. The complete reaction mixture was heated at 175° C. for 4 hours, and it was then cooled to room temperature and removed from the reaction vessel. Gas chromatographic fractionation yielded 7.3 g. of a product which was identified as 2 - phenyl - 4,4,5,5 - tetrafluoro-2-oxazoline by elemental analysis and by infrared, ultraviolet and nuclear magnetic resonance spectra. The product was found to have a B.P. of 72° C./10 mm. and M.P. 22–23° C.

Analysis.—Calc'd for $C_9H_5F_4NO$:

|  | C | H | F | N |
|---|---|---|---|---|
| Calc'd | 49.3 | 2.3 | 34.7 | 6.4 |
| Found | 49.9 | 2.6 | 34.4 | 6.3 |

This example illustrates one of the optional procedures for preparing 4,5-difluoro-2-oxazolines, i.e., the option involving generation of the epoxide intermediate in situ from oxygen and the corresponding fluoroolefin.

EXAMPLE II

*2-Phenyl-4,4,5,5-Tetrafluoro-2-Oxazoline*

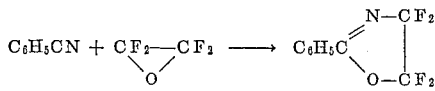

A mixture of 15 ml. (0.145 g. mole) of benzonitrile and 18 g. (0.155 g. mole) of tetrafluoroethylene epoxide in 15 ml. of toluene as solvent, contained under autogenous pressure in a pressure vessel at −80° C., was allowed to warm to −10° C. over a period of 44 hours. The resulting liquid mixture was distilled under reduced pressure, and after removal of toluene a higher boiling mixture of products was obtained. Analysis of this mixture by infrared spectroscopy and by gas chromatography indicated that it contained major proportions of benzonitrile and the product of Example I, i.e., 2-phenyl-4,4,5,5-tetrafluoro-2-oxazoline.

This example illustrates the second optional procedure for preparing 4,5-difluoro-2-oxazolines, i.e., the option involving a preformed fluoroolefin epoxide intermediate.

Tetrafluoroethylene epoxide can be prepared by direct oxidation of tetrafluoroethylene in the presence of bromine under irradiation of actinic light, as follows:

A mixture of gases having the following composition is charged at the ratios indicated in an actinic irradiation reactor maintained at atmospheric pressure:

| Air | 1.0 liter/min. |
|---|---|
| Oxygen | 130 ml./min. |
| Bromine | 15–20 ml./min. (0.3% in 99.7% $N_2$) |
| Tetrafluoroethylene | 330 ml./min. |

The actinic irradiation reactor is constructed from five quartz tubes, 50 mm. x 450 mm. The ultraviolet lamp, a photochemical 1200 U 11 lamp made by the General Electric Co., is mounted approximately 2 cm. from the quartz tubes and is held in place by supports made of "Masonite." The cells are surrounded by reflectors made of heavy aluminum foil and attached to the "Masonite" supports. Temperature control is obtained by balancing the heat produced by the lamp and the oxidation reaction with a controlled flow of compressed air over both the lamp and the reactor cell. The lamp temperature is maintained at 300–310° C., and the reactor temperature at 135–150° C. The gaseous product mixture is passed from the reactor to scrubbers containing water, where by-product carbonyl fluoride is quantitatively decomposed to hydrogen fluoride and carbon dioxide. The scrubbed exit stream of approximately 1.4 liter/min. has the following composition:

| | Mm. (Hg) partial pressure |
|---|---|
| Carbon dioxide | 140–180 |
| Tetrafluoroethylene | 50–70 |
| Tetrafluoroethylene epoxide | 24–27 |
| Perfluorocyclopropane | 7–9 |

The gas mixture is passed successively through potassium hydroxide scrubbers and traps cooled with solid carbon dioxide, and is then condensed in a trap at liquid nitrogen temperature. The epoxide is distilled, B.P. ca. −63.5° C., and is characterized by distinctive infrared absorption bands at 6.2, 7.8, 8.9 and 12.6 microns.

EXAMPLE III

*2-Phenyl-4-Trifluoromethyl-4,5,5-Trifluoro-2-Oxazoline*

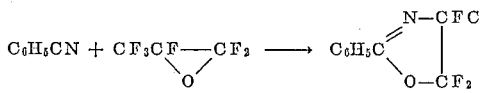

(A) A mixture of 12.7 g. (0.12 g. mole) of benzonitrile and 20.2 g. (0.12 g. mole) of hexafluoropropylene epoxide under autogenous pressure in an 80-ml. pressure vessel was heated at 100° C. for 9 hours. Fractional distillation of the liquid product yielded 10.3 g. of material boiling at 63–64° C./5 mm. The product was identified as 2 - phenyl - 4 - trifluoromethyl - 4,5,5-trifluoro-2-oxazoline by elemental analysis and by infrared, ultraviolet and nuclear magnetic resonance spectra. The position of the trifluoromethyl group on the ring was assigned on the basis of the nuclear magnetic resonance spectrum for fluorine.

Analysis.—Calc'd for $C_{10}H_5F_6NO$:

|  | C | H | F | N |
|---|---|---|---|---|
| Calc'd | 44.6 | 1.9 | 42.3 | 5.2 |
| Found | 45.0 | 2.2 | 42.4 | 5.3 |

(B) Reaction of 51.6 g. (0.5 g. mole) of benzonitrile and 50 g. (0.3 g. mole) of hexafluoropropylene epoxide was carried out at 175° C. for 3 hours by the procedure described in (A). 2-phenyl-4-trifluoromethyl-4,5,5-trifluoro-2-oxazoline, B.P. 78° C./14 mm., was obtained in a yield of 22.5 ml. from a total liquid product weighing 96.3 g. The product was indicated to be analytically pure by gas chromatography.

Hexafluoropropylene epoxide can be prepared by oxidation of hexafluoropropylene with alkaline aqueous hydrogen peroxide, preferably at temperatures between −50 and +50° C., as follows:

Into a reaction vessel is charged 750 ml. of methanol, 84 g. of potassium hydroxide dissolved in 150 ml. of water, and 525 ml. of 30% hydrogen peroxide. To the mixture is added 80 ml. of liquid hexafluoropropylene, and the mixture is agitated at −40° C. for 1.5 hours. There is isolated 62.8 g. of gaseous reaction product containing 35% of unreacted hexafluoropropylene and 65% of hexafluoropropylene-1,2-epoxide. The latter is obtained pure by gas chromatographic methods. It is a gas, B.P. −30±1° C., characterized by a strong infrared absorption band at 6.43 microns.

EXAMPLE IV

*2-Methyl-4,4,5,5-Tetrafluoro-2-Oxazoline*

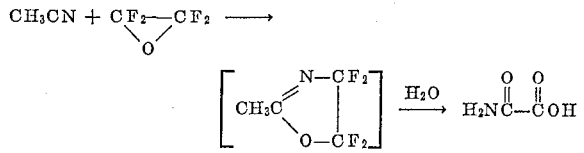

About 125 g. of a gaseous tetrafluoroethylene-tetrafluoroethylene epoxide mixture containing an estimated 5.2 g. (0.045 g. mole) of the epoxide was bubbled slowly into 100 ml. of acetonitrile cooled to 0° C. in a glass vessel at atmospheric pressure. Throughout the introduction of the mixture, over a period of several hours, the exit gas was monitored by gas chromatography and found to be free of epoxide. At the end, the temperature of the reaction mixture was 25° C. The solution was evaporated to dryness overnight in an open vessel under an air stream, and a solid residue weighing 4 g. was obtained. The solid product, M.P. 200° C. (decomp.), was identified as oxamic acid.

*Analysis.*—For $C_2H_3NO_3$:

|  | C | H | N | N.E. |
|---|---|---|---|---|
| Calc'd | 27.0 | 3.4 | 15.8 | 89 |
| Found | 26.3 | 3.7 | 13.2 | 85 |

The isolation of oxamic acid, a product of hydrolysis, indicates that the unhydrolysed reaction product of acetonitrile and tetrafluoroethylene epoxide was 2-methyl-4,4,5,5-tetrafluoro-2-oxazoline, which evidently hydrolyzes readily with formation of oxamic and acetic acids.

EXAMPLE V

2-Methyl-4-Trifluoromethyl-4,5,5-Trifluoro-2-Oxazoline

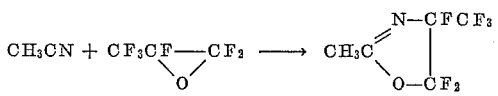

A mixture of 8.7 g. (0.21 g. mole) of acetonitrile and 28.3 g. (0.17 g. mole) of hexafluoropropylene epoxide under autogenous pressure in an 80-ml. pressure vessel was heated at 100° C. for 10 hours. Fractionation of the reaction mixture gave 11.1 g. of colorless oil, B.P. 42–43° C./200 mm. Gas chromatographic analysis indicated the presence of acetonitrile as a contaminant, and a purified fraction (2.4 g.) isolated by gas chromatography was identified by its nuclear magnetic resonance spectrum as 2-methyl-4-trifluoromethyl-4,5,5-trifluoro-2-oxazoline.

EXAMPLE VI

2-Phenyl-4,4,5,5-Tetrafluoro-2-Thiazoline

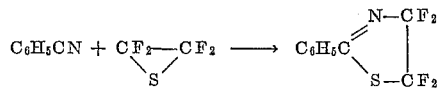

A mixture of 5 g. (0.05 g. mole) of benzonitrile and 3 g. (0.023 g. mole) of tetrafluoroethylene episulfide under autogenous pressure was heated at 150° C. for 10 hours. Distillation of the reaction mixture gave 1.9 g. of 2-phenyl-4,4,5,5-tetrafluoro-2-thiazoline, B.P. 52° C./0.05 mm., $N_D^{25}$ 1.5194. The product was identified by nuclear magnetic resonance and infrared spectra, the latter also indicating the presence of a small amount of benzonitrile as an impurity.

*Analysis.*—For $C_9H_5F_4NS$:

|  | N | S |
|---|---|---|
| Calc'd | 6.0 | 13.0 |
| Found | 6.6 | 12.0 |
|  | 6.7 | 11.8 |

Tetrafluoroethylene episulfide can be prepared by reaction of hexafluoropropylene epoxide and thiocarbonyl fluoride (cf. U.S. 2,962,529), as follows:

An 80-ml. pressure vessel containing 10 g. of hexafluoropropylene epoxide and 6 g. of thiocarbonyl fluoride is heated with agitation of contents to 200° C. during 2 hours, is kept at 200° C. for an additional 4 hours, and is finally cooled to room temperature. The gaseous product is fractionated at room temperature by gas chromatographic methods to yield separate fractions containing thiocarbonyl fluoride, trifluoroacetyl fluoride and trifluorothioacetyl fluoride, and finally a fraction of pure tetrafluoroethylene episulfide weighing 1.2 g., B.P. −10.5±1° C. The episulfide is characterized by distinctive nuclear magnetic resonance and infrared spectra.

Additional examples of the new, 4,5-difluoro-2-oxazolines and -2-thiazolines that can be prepared by the methods illustrated in Examples I–VI are shown in the following table, in which the column headings R, X, Y and Z represent the substituents of the formula

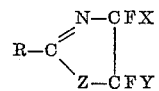

as previously defined.

TABLE I

| R | X | Y | Z |
|---|---|---|---|
| Benzyl | F | F | O |
| n-Octadecyl | F | F | O |
| β-Naphthyl | CF₃— | F | O |
| p-Phenylphenyl | CF₃— | CF₃— | O |
| p-Tolyl | Cl | Cl | O |
| Cyclohexyl | Cl | F | O |
| Phenyl | Cl(CF₂)₃— | F | O |
| 2-Phenylpropenyl | (CF₃)₂CF— | CF₃— | O |
| Methyl | H(CF₂)₁₀— | F | O |
| Ethyl | —CF₂CF₂CF₂— | —* | O |
| Cyclohexenyl | F | Cl | S |
| n-Propyl | CF₃— | CF₃— | S |
| 2-Anthracenyl | ClCF₂— | ClCF₂— | S |
| n-Octyl | Cl(CF₂)₃— | F | S |
| Ethynyl | H(CF₂)₄— | H(CF₂)₄— | S |
| n-Butyl | H(CF₂)₈— | F | S |
| Allyl | F(CF₂)₁₇— | F | S |

*A single bond in this instance joined to X to form a divalent perfluoroalkylene group.

Intermediates to 4,5-difluoro-2-oxazolines and -2-thiazolines having the representative substituents shown in Table I can be obtained by synthesis from available starting materials. Hydrocarbon nitriles are well known in the art. Any of the various fluoroolefin epoxides can be made by the procedure described for the preparation of hexafluoropropylene epoxide following Example II, i.e., by oxidation of the corresponding fluoroolefin with alkaline hydrogen peroxide. Any fluoroolefin episulfide in which substituent Y is fluorine can be obtained by the procedure shown for the preparation of tetrafluoroethylene episulfide following Example VI, i.e., by reaction of hexafluoropropylene epoxide with an appropriately-substituted thioacyl fluoride, illustrated in the equation

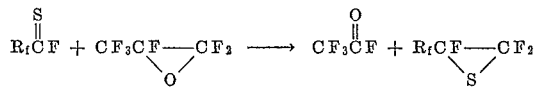

In the instance of tetrafluoroethylene episulfide the thioacyl fluoride is specifically thiocarbonyl difluoride. Fluoroolefin episulfides in which X and Y are not fluorine can be obtained by pyrolysis above 300° C., with loss of sulfur dioxide, of 1,1-dioxo-1,3-dithietanes of the formula

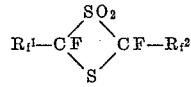

where $R_f^1$ and $R_f^2$ are polyfluoroalkyl. The 1,1-dioxo-1,3-dithietanes are described in U.S. Patent 3,058,993.

The 4,5-difluoro-2-oxazolines and -2-thiazolines of this invention are generally liquids at room temperature and are solvents for polymeric materials. As solvents, they are useful as media for making coatings or impregnations of polymeric materials on solid surfaces or in porous structures. Such coatings or impregnations have well-known utility for decoration, protection and conditioning, e.g., water-proofing, of the substrates. For example, a clear 5% solution of a low molecular weight polytetrafluoroethylene polymer in 2-phenyl-4-trifluoromethyl-4,5,5-trifluoro-2-oxazoline (i.e., the product of Example III) was prepared by warming the mixture with swirling on a steam bath. A strip of filter paper was dipped into the solution and then dried in a stream of air. The treated paper repelled drops of water, whereas an untreated strip and one treated with the oxazoline alone were readily wetted with water. A similar result was obtained with a solution of the tetrafluoroethylene polymer in 2-phenyl-4,4,5,5-tetrafluoro-2-thiazoline.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

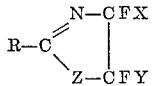

wherein:

R is hydrocarbon of up to 18 carbons; X and Y are selected from the group consisting of halogen of atomic number 9–17 and haloalkyl of up to 18 carbons, all halogen being of atomic number 9–17; and Z is a chalcogen of atomic number 8–16.

2. 2-phenyl-4,4,5,5-tetrafluoro-2-oxazoline.

3. 2-phenyl-4-trifluoromethyl-4,5,5 - trifluoro - 2-oxazoline.

4. 2-methyl-4-trifluoromethyl-4,5,5 - trifluoro - 2-oxazoline.

5. 2-phenyl-4,4,5,5-tetrafluoro-2-thiazoline.

6. The process which comprises reacting a hydrocarbonitrile with a member of the group consisting of fluoroolefin epoxides and episulfides at a temperature in the range of −50 to +250° C.

7. The process of claim 6 wherein the hydrocarbonitrile is reacted with a fluoroolefin epoxide formed in situ from oxygen and the precursor fluoroolefin.

8. The process which comprises reacting a hydrocarbonitrile, a fluoroolefin and oxygen at a temperature in the range −50 to +250° C.

9. The process which comprises reacting benzonitrile and tetrafluoroethylene epoxide at a temperature in the range −50 to +250° C.

10. The process of claim 9 wherein the tetrafluoroethylene epoxide is formed in situ from tetrafluoroethylene and oxygen.

11. The process which comprises reacting benzonitrile, tetrafluoroethylene and oxygen at a temperature in the range −50 to +250° C.

12. The process which comprises reacting benzonitrile and hexafluoropropylene epoxide at a temperature in the range −50 to +250° C.

13. The process which comprises reacting benzonitrile and tetrafluoroethylene episulfide at a temperature in the range −50 to +250° C.

No references cited.